United States Patent
Cantwell et al.

[11] Patent Number: 6,122,273
[45] Date of Patent: Sep. 19, 2000

[54] LINE INTERFACE SELECTION CIRCUIT

[75] Inventors: Robert W. Cantwell, Garland; Gregory J. Waldschmidt, Plano, both of Tex.

[73] Assignee: Alcatel USA Sourcing, L.P., Plano, Tex.

[21] Appl. No.: 08/988,547

[22] Filed: Dec. 10, 1997

[51] Int. Cl.[7] .............................. H04L 15/50; H04L 12/28
[52] U.S. Cl. .......................... 370/359; 370/419; 370/359
[58] Field of Search ................................... 370/210, 235, 370/257, 362, 423, 463, 357, 359, 419; 379/93.14, 93.07, 93.4, 93.28; 327/539; 326/68

[56] References Cited

U.S. PATENT DOCUMENTS 5,652,539  7/1997  Zanders et al. .......................... 327/539
5,680,063  10/1997  Ludwig et al. .......................... 326/80
6,014,431  1/2000  McHale et al. ....................... 379/93.14

OTHER PUBLICATIONS

Author unknown, "High–Speed CMOS 10–Bit Bus Switches", Quality Semiconductor, Inc., pp. 2–3 –2–6.

*Primary Examiner*—Chi H. Pham
*Assistant Examiner*—Brenda H. Pham
*Attorney, Agent, or Firm*—Baker Botts L.L.P.

[57] ABSTRACT

A line interface selection circuit comprises a bus switch operable to receive signals from a plurality of line interface units and to facilitate a connection between at least one of the plurality of line interface units and a telecommunication network. The bus switch is coupled to a line interface transformer having a primary side and a secondary side.

20 Claims, 2 Drawing Sheets

LINE INTERFACE SELECTION CIRCUIT

TECHNICAL FIELD OF THE INVENTION

This invention relates generally to the field of telecommunications and more particularly to a line interface selection circuit.

BACKGROUND OF THE INVENTION

Telecommunication systems typically include redundant circuit elements which facilitate continuous system operation even upon encountering a defect in an active circuit element. When a defect is detected, the defective element may be replaced with an equivalent redundant element, thus allowing the system to continue proper operation. Systems implementing redundant circuit elements benefit from devices facilitating switching between normal and redundant circuit elements.

Conventional line circuits may switch between normal and redundant line circuit elements using a mechanical relay to accomplish the switching function. A problem with this approach is that mechanical relays are typically large and bulky. In addition, they are more prone to failure and often consume more power than solid state elements. Another approach to switching between normal and redundant line circuit elements is to use a solid state relay with an isolated control input. A disadvantage of this approach is that the photo diode typically used to isolate the control line from the input line generally requires a large current to hold the switch closed. These solid state relays, therefore, may consume more power than is desirable.

SUMMARY OF THE INVENTION

In accordance with the teachings of the present invention, a line interface selection circuit is provided that eliminates or substantially reduces problems associated with prior approaches. According to one embodiment of the present invention, a line interface selection circuit comprises a bus switch operable to receive signals from a plurality of line interface units and to facilitate a removable connection between at least one of the plurality of line interface units and a telecommunication network. The bus switch is coupled to a line interface transformer having a primary side and a secondary side.

The invention has several important technical advantages. The circuitry used for switching is much smaller than conventional mechanical relay switches. The invention requires less current to hold the switch closed than prior approaches employing photo diodes to isolate the control line from the input line. In addition, the invention allows implementation of a lower cost line interface than the more typical solid state relays having isolated control inputs.

BRIEF DESCRIPTION OF THE DRAWINGS

A more complete understanding of the teachings of the present invention may be acquired by referring to the accompanying figures in which like reference numbers indicate like features and wherein.

DETAILED DESCRIPTION OF THE INVENTION

Figure 1:
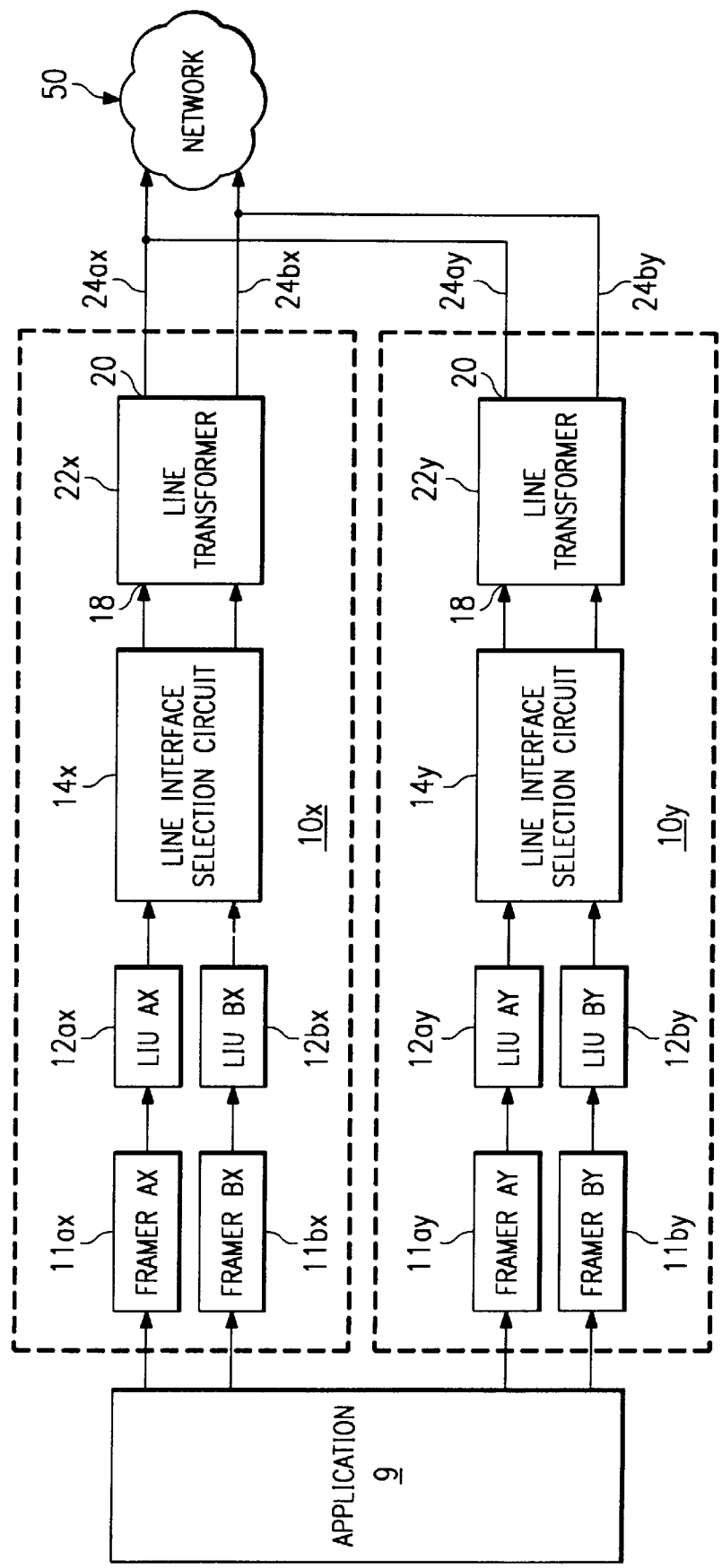
FIG. 1 is a block diagram of a line card constructed according to the teachings of the present invention.

FIG. 1 is a block diagram of a line card constructed according to the teachings of the present invention. In this embodiment, line cards 10x and 10y may comprise redundant circuitry for facilitating transmission of communications signals at various rates, such as T-1, E-1, or DS-3 rates. In another embodiment (not explicitly shown), a single line card may include the redundant circuitry shown in FIG. 1 to reside on two separate line cards. Because, in this embodiment, line cards 10x and 10y are identical in structure and function, and for simplicity of description, only the details of a single line card, referred to generally as line card 10, will be described.

Line card 10 may receive signals from an application 9 at framers 11a–11b. Application 9 may comprise, for example, a telecommunications switching fabric operable to receive signals from a variety of sources and facilitate transmission of the signals to desired destinations. In this embodiment, line card 10 includes two framers 11a–11b, referred to generally as framers 11. Line card 10 may include any number of framers 11 for receiving signals from any number of channels without departing from the scope of the invention. Line card 10 may further include a plurality of line interface units 12 coupled to associated framers 11. Line interface units 12 may receive signals from associated framers 11, and further prepare the signals for transmission over a network 50. In this embodiment, line card 10 includes two line interface units 12a–12b, referred to generally as line interface units 12. Thus, each line card 10 in the illustrated embodiment couples to two lines in a telecommunications network. Line card 10 may couple to more or fewer lines and can advantageously couple to 28 lines or more. Line card 10 may alternatively comprise any number of line interface units for receiving signals from associated framers without departing from the scope of the present invention.

A line interface selection circuit 14 may be coupled to line interface units 12. As used in this document, the term "coupled" does not necessarily denote a direct connection between elements. One or more elements may, but need not, reside between elements said to be "coupled" to each other. Line interface selection circuit 14 may receive a plurality of signals from line interface units 12 and provide connections between selected line interface units 12 and network 50. In one embodiment, line interface selection circuit 14 may be directly connected to line interface units 12. In another embodiment (described in more detail below), additional circuit elements may reside between line interface units 12 and line interface selection circuit 14.

One or more line interface transformers 22 may provide an interface between line interface units 12 and network 50. Each line interface unit 12 on line card 10 may have an associated line interface transformer 22. Each line interface transformer 22 comprises a primary side 18 and a secondary side 20. Line interface units 12 are coupled to primary side 18 of line interface transformer 22. Network 50 is coupled to secondary side 20 of line interface transformer 22 through communication channels 24. Communication channels 24 may comprise, for example, DS1 lines. Each line interface 12 may have an associated communication channel 24. Line interface selection circuit 14 may be coupled to primary side 18 or secondary side 20 of line interface transformer 22. Coupling line interface selection circuit 14 to primary side 18 of line interface transformer 22 provides an advantage of isolating line interface selection circuit 14 from transients on communication channels 24.

In operation, line card 10 receives signals from application 9 at framers 11. Framers 11 group data bits into particular formats and flag each end of the group to indicate the beginning and the end of each frame. Line interface units 12 receive framed signals from framers 11 and further prepare the signals for transmission over network 50. Line interface selection circuit 14 receives these signals from line interface units 12 and selects one or more line interface units 12 for connection to network 50.

In the embodiment shown in FIG. 1, line interface units 12ax–12bx each service separate communication channels 24ax–24bx, respectively. Similarly, redundant line interface units 12ay–12by may service communication channels 24ay–24by, respectively. Line interface selection circuits 14x and 14y may operate to select between, for example, interface units 12ax–12bx and 12ay–12by to drive outgoing communication channels 30a–30b. If, for example, line interface units 12ax–12bx of line card 10x are currently selected for connection with network 50, and a fault is detected in the signal from line interface unit 12ax or 12bx, line interface selection circuit 14x may deselect line interface unit 12ax–12bx, and line interface selection circuit 14y may enable redundant line interface units 12ay–12by of line card 10y. Line interface selection circuits 14x and 14y, thus provide a method of switching between redundant signals upon detection of a defect in the selected signal.

Alternatively, line interface units 12ax and 12bx may comprise redundant circuit elements for servicing a single communication channel 24. In that case, line interface selection circuit 14x may select, for example, between line interface units 12ax and 12bx for connection with network 50. If, for example, line interface unit 12ax is currently selected for connection with network 50, and a fault is in the signal from line interface unit 12ax, line interface selection circuit may deselect line interface unit 12ax in favor of redundant line interface unit 12bx. Additional details of the operation of line interface selection circuits 14 will be described later in this document.

Figure 2:
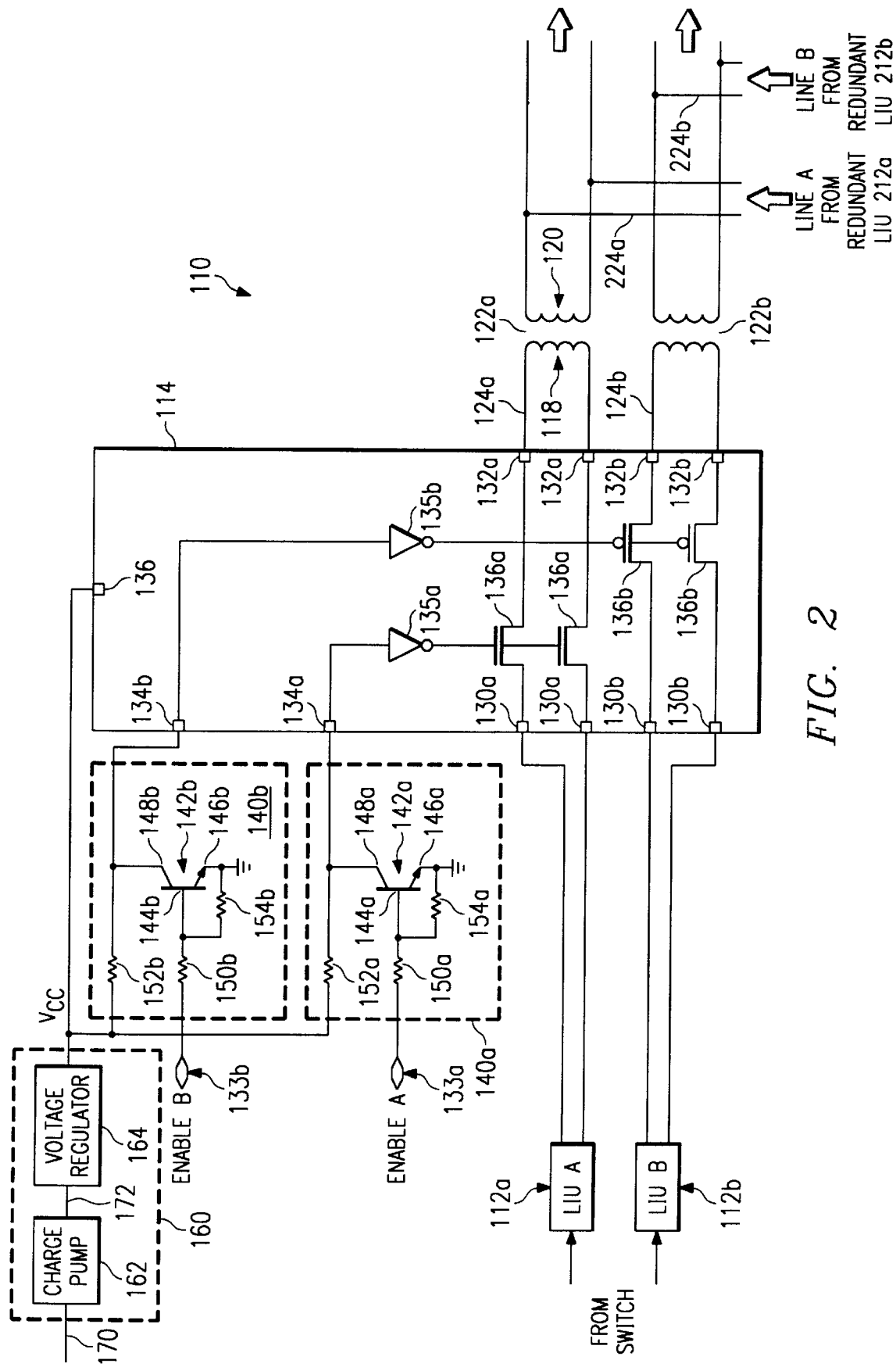
FIG. 2 is a block diagram of a line interface selection circuit constructed according to the teachings of the present invention.

FIG. 2 is a block diagram of a line interface selection circuit constructed according to the teachings of the present invention. Line interface selection circuit 110 may include one or more bus switch integrated circuits 114. Each bus switch integrated circuit 114 may receive signals from one or more line interface units 112, and facilitate connections between selected line interface units 112 and associated communication channels 124. Communication channels 124 may provide connection to a network (not explicitly shown). In this embodiment, line interface units 112a and 112b each service a separate communication channel 124a and 124b, respectively. Alternatively, line interface units 112a–112b may comprise redundant circuit elements servicing a single communication channel 124 (not explicitly shown).

Line interface selection circuit 110 may further include line interface transformers 122. Line interface transformers 122 receive signals from associated line interface units 112, and transform the signals for transmission over associated communication channels 124. Each line interface transformer 122 comprises a primary side 118 and a secondary side 120. Line interface units 112 are coupled to primary sides 118 of line interface transformers 122. Communication channels 124 are coupled to secondary sides 120 of line interface transformers 122. Bus switch integrated circuit 114 may be coupled to primary sides 118 or secondary sides 120 of line interface transformers 122. Coupling bus switch integrated circuit 114 to primary sides 118 of line interface transformers 122 provides an advantage of isolating bus switch integrated circuit 114 from transients on communication channels 124.

Bus switch integrated circuit 114 may include input terminals 130a–130b, and output terminals 132a–132b. Input terminals 130a–130b receive signals from line interface units 112a–112b, respectively. Each input terminal 130 may be coupled to an output terminal 132 through a FET switch 136a–136b. Enable terminals 134a–134b may receive signals instructing bus switch 114 to select or deselect particular line interface units 112 for connection with appropriate communication channels 124. Bus switch integrated circuit 114 may, for example, comprise an enable terminal 134 for each pair of input terminals 130. Enable terminal 134 could, alternatively, control more or less bus switches without departing from the scope of the invention. When enabled, FET switches 136a–136b create low impedance connections between input terminals 130 and associated output terminals 132. When disabled, FET switches 136a–136b create high impedance connections between input terminals 130 and associated output terminals 132.

In the illustrated embodiment, bus switch integrated circuit 114 comprises a model QS3384 or model QS32384 bus switch integrated circuit available from Quality Semiconductor, Inc. Other bus switch integrated circuits may be used without departing from the scope of the invention. Bus switch integrated circuit models QS3384 and QS32384 include invertors 135a–135b coupled to FET switches 136a–136b, respectively. When enable signal 133a is low, FET switch 136a creates a low impedance connection between input terminal 130a and output terminal 132a. When enable signal 133a is high, FET switch 136a creates a high impedance connection between input terminal 130a and output terminal 132a. FET switch 136b operates in a like manner in response to enable signal 133b. it may be desirable to minimize the current drawn by bus switch integrated circuit 114 as it operates. One method of minimizing current draw of bus switch integrated circuit 114 is to keep the voltage of enable signal 133 very close to either regulated power supply voltage $V_{cc}$, or ground. Eliminating substantially all of the voltage difference between enable signal 133 and the regulated power supply signal, $V_{cc}$, minimizes leakage current in bus switch integrated circuit 114, and thus, minimizes current draw of the device. Leakage current in bus switch integrated circuit 114 may be minimized, for example, by passing each enable signal through a voltage translator circuit 140 prior to its reaching enable terminal 134 of bus switch integrated circuit 114. Voltage translator circuit 140 may comprise any circuit operable to receive an input signal and force that signal to approximate either a reference voltage or ground.

Voltage translator circuit 140 may comprise, for example, an open collector circuit. Each open collector circuit may comprise a transistor 142, which receives an enable signal at its base 144. Emitter 146 of transistor 142 may be coupled to base 144 and to ground. Collector 148 of transistor 142 receives an input voltage, $V_{cc}$, and is coupled to enable terminal 134 of bus switch integrated circuit 114. A base load 150 and a collector load 152 may be coupled to base 144 and collector 148 of transistor 142, respectively. Base load 150 may comprise, for example, a 1,000 Ohm (Ω) resistor. Collector load 152 may comprise, for example, a 10,000 Ω resistor. A base-emitter load 154 may be coupled between base 144 and emitter 146 of transistor 142. Base-emitter load 154 may comprise, for example, a 470 Ω resistor. The illustrated open-collector circuit is only one example of an applicable configuration. Other open-collector circuits could be implemented without departing from the scope of the invention.

Bus switch integrated circuit 114 receives a regulated power supply signal $V_{cc}$ at power supply terminal 136. During circuit operation, it is desirable that the connection between selected line interface units 112 and their associated communication channels 124 remain conductive until it is intended that the connections be terminated. Connections in bus switch integrated circuit 114 may inadvertently terminate if the voltages of the signals received from line interface units 112 are within approximately 1 volt of the power supply signal to bus switch integrated circuit 114. Such inadvertent terminations may be avoided, for example, by maintaining regulated power supply voltage $V_{cc}$ at a level approximately one volt above the voltage of the largest typical signal received from line interface units 112. In addition, to avoid damaging bus switch integrated circuit 114, regulated voltage supply signal $V_{cc}$ should not exceed the absolute maximum tolerance of the device. Signals received from line interface units 112 may typically be as large as, for example, 5 volts. The absolute maximum voltage tolerated by bus switch integrated circuit 114 may be, for example, 7.0 volts. Providing a regulated power supply voltage $V_{cc}$ of, for example, 6.8 volts, ensures that connections in bus switch integrated circuit 114 will not be inadvertently terminated, and also avoids damage to the device.

Where a regulated power supply voltage of approximately 6.8 volts is not conveniently available, it may be desirable to use a power supply modification circuit 160 to obtain such a voltage. A power supply modification circuit 160 may be coupled to power supply terminal 136 of bus switch integrated circuit 114. Power supply modification circuit 160 may include a charge pump 162, which may receive a power supply signal 170. Charge pump 162 may comprise any device operable to increase the voltage of power supply signal 170 to generate an increased power supply signal 172. Typical power supply voltages may be, for example, 5 volts. Power supply modification circuit 160 may receive a 5 volt signal and, through charge pump 162, increase the 5 volt power supply signal to, for example, a 12 volt increased power supply signal 172.

Power supply modification circuit 160 may further include a voltage regulator 164 coupled to charge pump 162. Voltage regulator 164 may be any device operable to receive increased power supply signal 172 from charge pump 162, and modify increased power supply signal 172 to create a regulated power supply signal, $V_{cc}$. For example, voltage regulator 164 may receive a 12 volt increased power supply signal 172 from charge pump 162, and modify the signal to obtain an approximately 6.8 volt regulated power supply signal, $V_{cc}$. Voltage regulator 164 may be a linear regulator comprising a standard integrated circuit having a precision voltage reference. For example, voltage regulator 164 may be a linear regulator from Maxim Semiconductor, model number MAX1659. In another embodiment, voltage regulator 164 may comprise a zenor shunt regulator.

In operation, bus switch integrated circuit 114 receives signals from line interface units 112. Bus switch integrated circuit 114 may receive an enable signal 133, instructing bus switch integrated circuit 114 to establish a connection between a selected line interface unit 112 and its associated communication channel 124. For various reasons, it may be desirable to deselect selected line interface unit 112 in favor of a redundant line interface unit. For example, a defect may be detected in the signal received from a selected line interface unit 112, requiring a switch to a redundant line interface unit to facilitate uninterrupted circuit operation.

In the embodiment shown in FIG. 2, bus switch integrated circuit 114 may receive enable signals 133a–133b instructing bus switch integrated circuit 114 to establish connections between line interface units 112a–112b and communication channels 124a–124b, respectively. If, for example, a fault is detected in the signal from line interface unit 112a or 112b, bus switch integrated circuit 114 may terminate the connection between selected line interface units 112a–112b and their associated communication channels 124a–124b. In addition, a redundant bus switch integrated circuit 214 (not explicitly shown) may receive enable signals instructing bus switch integrated circuit 214 to establish connections between redundant line interface units 212a–212b (not explicitly shown) and their associated communication channels 224a–224b. Redundant circuit elements 212a–212b and 214 may reside on a single line card, or on a separate line card from line interface units 112a–112b and bus switch integrated circuit 114.

The embodiment shown in FIG. 2 contemplates using multiple bus switch integrated circuits to accomplish the redundant switching function of the circuit. In another embodiment (not explicitly shown), a single bus switch integrated circuit may facilitate switching between redundant circuit elements. For example, as discussed above, line interface units 112a–112b may comprise redundant line interfaces serving a single communication channel. In that case, bus switch integrated circuit 114 may select either line interface unit 112a or 112b as the active line interface unit. Upon detection of a fault in the active signal, bus switch integrated circuit 114 may deselect line interface unit 112a in favor of redundant line interface unit 112b.

Although the present invention and its advantages have been described in detail, it should be understood that various changes, substitutions and alterations can be made therein without departing from the spirit and scope of the invention as defined by the appended claims.

What is claimed is:

1. A line interface selection circuit, comprising:
   a bus switch operable to receive signals from a plurality of line interface units and to facilitate a removable connection between at least a first one of the plurality of line interface units and a telecommunications network, the bus switch operable to receive an enable signal to terminate the removable connection between the first one of the plurality of line interface units and the network, the bus switch operable to establish the removable connection between a second one of the plurality of line interface units and the network in response to detecting a fault in a signal carried over the removable connection between the first one of the plurality of interface units and the network; and
   a line interface transformer coupled to the bus switch, the line interface transformer having a primary side and a secondary side.

2. The line interface selection circuit of claim 1, wherein the bus switch is coupled to the primary side of the line interface transformer.

3. The line interface selection circuit of claim 1, wherein the bus switch is coupled to the secondary side of the line interface transformer.

4. The line interface selection circuit of claim 1, further comprising a power supply modification circuit, the power supply modification circuit comprising:
   a charge pump operable to receive a power supply signal and to generate an increased power supply signal; and
   a voltage regulator coupled to the charge pump and the bus switch, the voltage regulator operable to receive the increased power supply signal from the charge pump and to generate a regulated power supply signal, the regulated power supply signal having a voltage greater than the voltage of the signal transmitted by the plurality of line interface units.

5. The line interface selection circuit of claim 4, wherein the voltage regulator comprises a linear regulator.

6. The line interface selection circuit of claim 1, further comprising a voltage translator circuit coupled to the bus switch, the voltage translator circuit operable to minimize current draw of the bus switch.

7. The line interface selection circuit of claim 6, wherein the voltage translator circuit comprises an open collector transistor having its collector coupled to the bus switch, and receiving an enable signal at its base.

8. The line interface selection circuit of claim 7, wherein the open collector circuit comprises:
   a collector load coupled between the collector of the transistor and a voltage source;
   a base load coupled between the base of the transistor and an enable signal; and
   a base-emitter load coupled between the base of the transistor and the emitter of the transistor.

9. The line interface selection circuit of claim 8, wherein:
   the collector load comprises a 10,000 Ohm resistor;
   the base load comprises a 1000 Ohm resistor; and
   the base-emitter load comprises a 470 Ohm resistor.

10. A method of facilitating a removable connection between a network and one of a plurality of line interface units, comprising:
    receiving a first enable signal at a first bus switch;
    establishing, in response to the first enable signal, a connection between a first line interface unit and a network through the first bus switch;
    detecting a fault in a signal carried over the connection between the first line interface unit and the network;
    receiving a second enable signal at a second bus switch;
    terminating the connection between the first line interface unit and the network;
    establishing, in response to the second enable signal, a connection between a second line interface unit and the network through the second bus switch.

11. The method of claim 10, wherein the first bus switch and the second bus switch are part of a single integrated circuit.

12. The method of claim 10, further comprising isolating the first bus switch and the second bus switch from the network by coupling the first bus switch and the second bus switch to the primary side of a line interface transformer and coupling the network to the secondary side of the line interface transformer.

13. The method of claim 10, further comprising regulating a power supply signal to the first and second bus switches by:
    receiving a power supply signal at a charge pump;
    increasing the magnitude of the power supply signal; and
    regulating the magnitude of the increased power supply signal to create a regulated power supply signal having a magnitude greater than the magnitude of signals transmitted by the plurality of line interface units.

14. The method of claim 10, further comprising minimizing the current draw of the first and second bus switches.

15. The method of claim 14, wherein minimizing the current draw of the first and second bus switch integrated circuits comprises adjusting the voltage of the enable signals to approximate the voltage of a power supply voltage of the bus switches or ground.

16. A line card, comprising:
    a plurality of line interface units, each line interface unit operable to prepare a signal for transmission over a network;
    a line interface selection circuit operable to receive signals from the plurality of line interface units, the line interface selection circuit comprising a bus switch operable to facilitate a removable connection between at least a first one of the plurality of line interface units and a network, the bus switch operable to receive an enable signal to terminate the removable connection between the first one of the plurality of line interface units and the network, the bus switch operable to establish the removable connection between a second one of the plurality of line interface units and the network in response to detecting a fault in a signal carried over the removable connection between the first one of the plurality of interface units and the network;
    a line interface transformer coupled to the bus switch, the line interface transformer having a primary side and a secondary side.

17. The line card of claim 16, wherein the line interface selection circuit comprises:
    a charge pump operable to receive a bus switch power supply signal and to generate an increased bus switch power supply signal; and
    a voltage regulator coupled to the charge pump and the bus switch, the voltage regulator operable to receive the increased bus switch power supply signal from the charge pump and to generate a regulated bus switch power supply signal, the regulated bus switch power supply signal having a voltage greater than the voltage of the signals transmitted by the plurality of line interface units.

18. The line card of claim 17, wherein the voltage regulator comprises a linear regulator.

19. The line card of claim 16, wherein the line interface selection circuit comprises a voltage translator circuit coupled to the bus switch, the voltage translator circuit operable to minimize current draw of the bus switch.

20. The line card of claim 18, wherein the voltage translator circuit comprises an open collector transistor having its collector coupled to the bus switch, and receiving an enable signal at its base.

* * * * *